No. 803,072. PATENTED OCT. 31, 1905.
S. SCOTT & J. CUNDY.
SAFETY GATE FOR DAMS.
APPLICATION FILED SEPT. 2, 1904.

Witnesses
Ernest Pulsford
Edgar B. McBath

Inventors
Samuel Scott,
John Cundy
by O'Meara & Brock
Attorneys

UNITED STATES PATENT OFFICE.

SAMUEL SCOTT AND JOHN CUNDY, OF ENGLE, COLORADO.

SAFETY-GATE FOR DAMS.

No. 803,072.          Specification of Letters Patent.          Patented Oct. 31, 1905.

Application filed September 2, 1904. Serial No. 223,113.

*To all whom it may concern:*

Be it known that we, SAMUEL SCOTT and JOHN CUNDY, citizens of the United States, and residents of Engle, in the county of Las Animas and the State of Colorado, have invented a new and useful Improvement in Safety-Gates for Dams, of which the following is a specification.

The object of this invention is a safety-gate for dams adapted to be automatically opened and closed by pressure of the water, opening when the water has reached a certain height and closing when the water falls below that height. When used in connection with reservoirs, the gate will prevent the bursting of the reservoir-walls by automatically opening before the water has risen to a height bringing the pressure to the danger-point. When used upon rivers in sections of the country where irrigation-ditches are common, the gate will serve to keep them free of mud and sand, as during a flood, when the water ordinarily passes off over the dams, the gate will open, placing itself in a horizontal position, where it affords the least obstruction to the passage of the water, and the mud and sand, which would otherwise be backed into the irrigation-ditches, is permitted to escape under the gate, the gate closing when the water falls.

The invention consists in the novel features of construction and combination of parts hereinafter described, pointed out in the claims, and shown in the accompanying drawings, in which—

Figure 1:
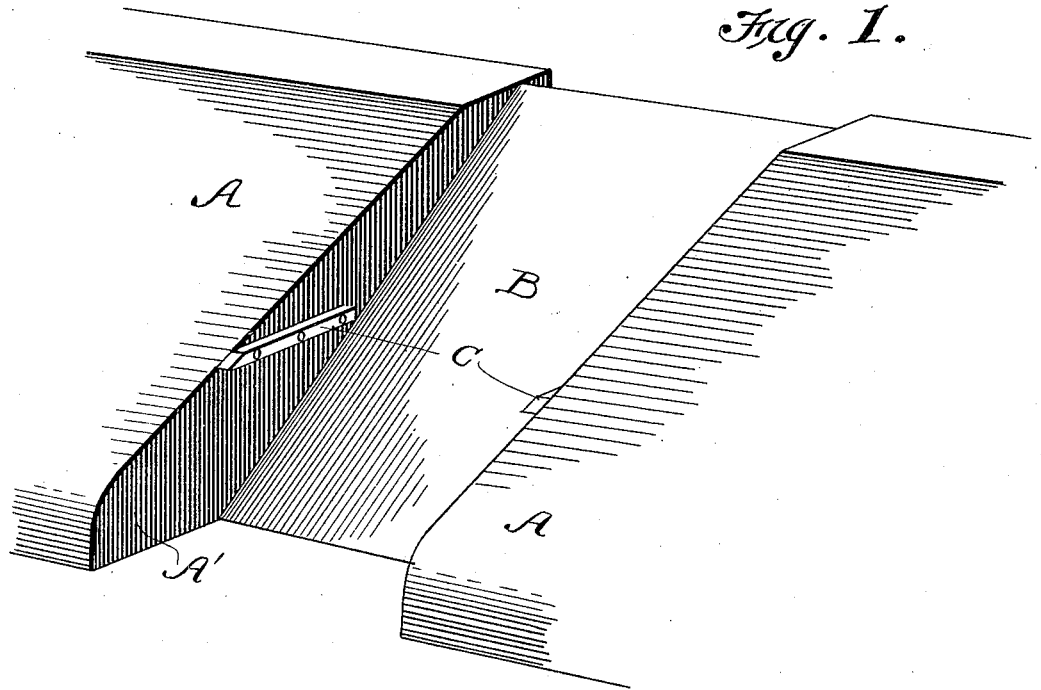
Figure 2:
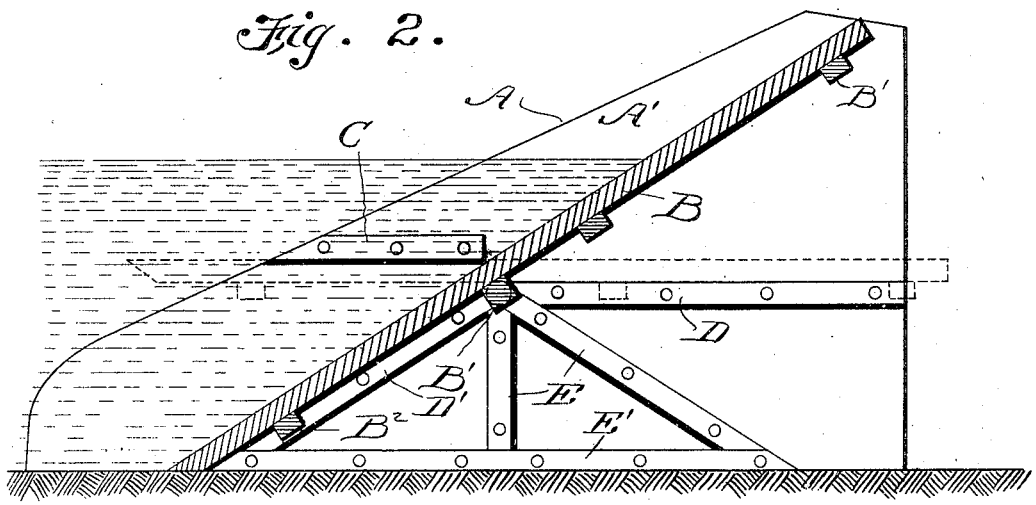

Figure 1 is a perspective view of our gate. Fig. 2 is a vertical section taken longitudinally through the gate.

In the drawings, A represents the dam or walls of a reservoir having a gateway therein, which opening or gateway has the straight parallel sides A'. The gate B normally rests in a closed position obliquely with reference to the perpendicular height of the walls A. Intermediate its ends the gate carries on its under side an axle B', rounded at its ends and journaled in the sides A', whereby the gate is pivotally hung between the said walls. This axle is arranged slightly nearer what is normally the lower end of the gate than the upper end. The gate is also provided with transverse braces B², which stop short of the side edges of the gate. In advance of the gate are arranged on each of the sides A' a horizontal cleat C, and to the rear of the gate is arranged a similar cleat D, but in a lower plane than the cleats C. To each side wall is also secured the triangular frame comprising the inclined front brace D', rear braces E, and a base E'. When in a closed position, as shown in full lines in Fig. 2, the gate rests on the front braces or cleats D', and when in a horizontal position, as when the gate is open, as shown in dotted lines in Fig. 2, the gate rests on the cleats D, and a portion of the upper face of the gate bears on the under faces of the cleats C, limiting upward movement of the lower end of the gate.

With a normal height of water the pressure will be mainly on the lower portion of the gate, and it will be held firmly in a closed position against the brace D'. The area of the surface of the gate above the pivotal point is greater than below that point, and when the water has risen to such a height that the pressure on the upper portion of the gate exceeds that on the lower portion the gate will be opened. As the water falls to a normal and safe level, running practically flush with the gate in its open position, the friction of the water on the under surface of the gate will lift the upper end, slightly lowering the other end, which will be caught by the pressure of the water and carried downward and the gate closed.

Having thus fully described our invention, what we claim as new, and desire to secure by Letters Patent, is—

1. The combination with a water-gateway, of a gate pivotally mounted therein and adapted to lie obliquely with reference to a perpendicular line when in a closed position, the surface area of the gate below the pivotal point being less than that above the pivotal point and means carried by the gateway adapted to hold the gate in a horizontal position upon a predetermined rise in the water-level.

2. The combination with a dam having a gateway therein, a gate pivoted in the said gateway, and adapted in a closed position to lie obliquely in the said gateway, cleats carried by the sides of the gateway, in advance of and to the rear of the gate, the cleats in advance of the gate being in a higher plane than those to the rear, and inclined cleats adapted to be engaged by the gate when the gate is closed.

SAMUEL SCOTT.
                     JOHN CUNDY.

Witnesses:
    A. F. HOLLENBECK,
    R. D. SMITH.